United States Patent
Li et al.

(10) Patent No.: US 8,655,911 B2
(45) Date of Patent: Feb. 18, 2014

(54) EXPRESSING FREQUENT ITEMSET COUNTING OPERATIONS

(75) Inventors: Wei Li, Redwood City, CA (US); Jiansheng Huang, Daly City, CA (US); Ari Mozes, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1844 days.

(21) Appl. No.: 10/643,628

(22) Filed: Aug. 18, 2003

(65) Prior Publication Data

US 2005/0044094 A1 Feb. 24, 2005

(51) Int. Cl.
*G06F 7/00* (2006.01)
*G06F 17/30* (2006.01)

(52) U.S. Cl.
USPC .................. 707/776; 707/730; 707/754

(58) Field of Classification Search
USPC .............. 707/5, 6, 101, 776, 730, 754
See application file for complete search history.

(56) References Cited

U.S. PATENT DOCUMENTS

| | | | |
|---|---|---|---|
| 5,259,066 A | 11/1993 | Schmidt | |
| 5,724,573 A | 3/1998 | Agrawal et al. | |
| 5,794,209 A | 8/1998 | Agrawal et al. | |
| 5,848,408 A | 12/1998 | Jakobsson et al. | |
| 5,963,935 A | 10/1999 | Ozbutun et al. | |
| 6,049,797 A | 4/2000 | Guhu et al. | |
| 6,067,540 A | 5/2000 | Ozbutun et al. | |
| 6,138,117 A * | 10/2000 | Bayardo | 1/1 |
| 6,189,005 B1 * | 2/2001 | Chakrabarti et al. | 707/6 |
| 6,192,374 B1 | 2/2001 | Lawrence | |
| 6,195,656 B1 | 2/2001 | Ozbutun et al. | |
| 6,282,540 B1 | 8/2001 | Goldensher et al. | |
| 6,324,533 B1 * | 11/2001 | Agrawal et al. | 1/1 |
| 6,385,608 B1 | 5/2002 | Mitsuishi et al. | |
| 6,389,416 B1 * | 5/2002 | Agarwal et al. | 1/1 |
| 6,415,287 B1 | 7/2002 | Wang et al. | |
| 6,453,404 B1 | 9/2002 | Bereznyi et al. | |
| 6,473,757 B1 | 10/2002 | Garofalakis et al. | |
| 6,490,582 B1 | 12/2002 | Fayyad et al. | |
| 6,507,843 B1 | 1/2003 | Dong et al. | |
| 6,567,936 B1 | 5/2003 | Yang et al. | |
| 6,665,669 B2 * | 12/2003 | Han et al. | 1/1 |

(Continued)

OTHER PUBLICATIONS

George Lumpkin, "Frequent Itemsets in Oracle10g, An Oracle White Paper", Aug. 15, 2003.*

(Continued)

*Primary Examiner* — Shew-Fen Lin
(74) *Attorney, Agent, or Firm* — Hickman Palermo Truong Becker Bingham Wong LLP

(57) ABSTRACT

Techniques are provided for (1) extending SQL to support direct invocation of frequent itemset operations, (2) improving the performance of frequent itemset operations by clustering itemset combinations to more efficiently use previously produced results, and (3) making on-the-fly selection of the occurrence counting technique to use during each phase of a multiple phase frequent itemset operation. When directly invoked in an SQL statement, a frequent itemset operation may receive input from results of operations specified in the SQL statement, and provide its results directly to other operations specified in the SQL statement. By clustering itemset combinations, resources may be used more efficiently by retaining intermediate information as long as it is useful, and then discarding it to free up volatile memory. Dynamically selecting an occurrence counting technique allows a single frequent itemset operation to change the occurrence counting technique that it is using midstream, based on cost considerations and/or environmental conditions.

28 Claims, 7 Drawing Sheets

(56) References Cited

U.S. PATENT DOCUMENTS

| | | | |
|---|---|---|---|
| 6,760,718 | B2 | 7/2004 | Tamura |
| 6,832,216 | B2 * | 12/2004 | Shintani et al. ............... 707/2 |
| 6,941,303 | B2 * | 9/2005 | Perrizo ............................. 1/1 |
| 6,993,534 | B2 * | 1/2006 | Denesuk et al. ............ 707/102 |
| 6,996,551 | B2 * | 2/2006 | Hellerstein et al. ........... 706/48 |
| 7,243,100 | B2 * | 7/2007 | Ma et al. ............................ 1/1 |
| 2002/0059191 | A1 * | 5/2002 | Tamura ........................... 707/2 |
| 2002/0073019 | A1 | 6/2002 | Deaton |
| 2002/0087561 | A1 * | 7/2002 | Ching Chen et al. ........ 707/100 |
| 2002/0116457 | A1 | 8/2002 | Eshleman et al. |
| 2003/0009456 | A1 * | 1/2003 | Shintani et al. .................. 707/6 |
| 2003/0028531 | A1 * | 2/2003 | Han et al. .......................... 707/6 |
| 2003/0149554 | A1 | 8/2003 | Lambert et al. |
| 2003/0217055 | A1 * | 11/2003 | Lee et al. .......................... 707/6 |
| 2004/0225742 | A1 | 11/2004 | Loaiza et al. |
| 2005/0027710 | A1 * | 2/2005 | Ma et al. ....................... 707/100 |
| 2005/0149540 | A1 | 7/2005 | Chan et al. |
| 2006/0004807 | A1 | 1/2006 | Cruanes et al. |
| 2006/0074824 | A1 * | 4/2006 | Li .................................... 706/20 |

OTHER PUBLICATIONS

Guimei Liu et al. "Ascending Frequency Ordered Prefix-tree: Efficient Mining of Frequent Patterns", Proceedings of the Eighth International Conference on Database Systems for Advanced Applications (DASFAA'03), Mar. 2003.*

Oracle Corporation, "Oracle® Data Mining, Concepts," 10g Release 1 (10.1), Part No. B10698-01, Dec. 2003, 118 pages.

Wei Li, et al.,"Computing Frequent Itemsets Inside Oracle 10G", Proceedings of the 30$^{th}$ VLDB Conference, Toronto, Canada, Aug. 29, 2004, 4 pages.

Office Action from European Patent Application No. 01968979.3-2212, dated Aug. 6, 2004 (3 pgs.).

Current Claims in European Patent Application No. 01968979.3-2212 (3 pgs).

Written Opinion from PCT Patent Application No. PCT/US02/06981 dated Oct. 3, 2004(8 pgs.).

Current Claims in PCT Patent Application No. PCT/US02/06981 (8 pgs.).

Office Action from Canadian Patent Application No. 2,448,050 dated Oct. 1, 2004 (2 pgs).

Current Claims in Canadian Patent Application No. 2, 448,050 (48 pgs).

Grahne, Costa et al., "High Performance of Maximal Frequent Itemsets," 6$^{th}$ International Workshop on High Performance Data Mining, Mar. 22, 2003, 11 pages.

Agrawal, Rakesh et al., "Mining Association Rules Between Sets of Items in Large Database," SIGMOND—1993, ACM Issue 2, vol. 22, pp. 207-216.

Burdick, Doug et al., "MAFIA: A Maximal Frequent Itemset Algorithm for Transactional Databases," 17$^{th}$ International Conference on Data Engineering—2001, retrieved fromhttp://www.almaden.ibm/cs/projects/lis/hdp/Publications/papers/sigmond93.pdf, pp. 1-6.

Grahne, Gösta et al., "High Performance Mining in Maximal Frequent Itemsets," May 17, 2005, retrieved from the internet at http://www.cs.concordia.ca/db/dbdm/hpdm/hpdm03.pdf, 10 pages.

Agrawal et al., "Mining Association Rules between Sets of Items in Large Databases", Proceedings of the 1993 ACM SIGMOD Conference, May 1993, 10 pages.

Rantzau, R., "Processing Frequent Itemset Discovery Queries by Division and Set Containment Join Operators", DMKD 2003, Jun. 13, 2003, 8 pages.

Agrawal et al., "Fast Algorithms for Mining Association Rules", In Proceedings of the Twentieth International Conference on Very Large Databases, 1994, 32 pages.

Jensen et al., "Frequent Itemset Counting Across Multiple Tables", Electrical Engineering and Computer Science, University of Michigan, LNAI 1805, Springer-Verlag Verlag Berlin Heidelberg, 2000, 13 pages.

* cited by examiner

| | iid1 | iid2 | iid3 | iid4 | iid5 |
|---|---|---|---|---|---|
| ROW 102 | apple | banana | NULL | NULL | NULL |
| ROW 104 | apple | milk | banana | NULL | NULL |
| ROW 106 | orange | NULL | NULL | NULL | NULL |

TABLE 100 (MULTIPLE-ITEMS-PER-ROW FORMAT)

FIG. 1

EXPRESSING FREQUENT ITEMSET COUNTING OPERATIONS

CROSS-REFERENCE TO RELATED APPLICATIONS

This application is related to the following U.S. patent applications:

Ser. No. 10/643,629, entitled FREQUENT ITEMSET COUNTING USING CLUSTERED PREFIXES AND INDEX SUPPORT, filed on Aug. 18, 2003; and Ser. No. 10/643,563, entitled DYNAMIC SELECTION OF FREQUENT ITEMSET COUNTING TECHNIQUE, filed on Aug. 18, 2003;

the contents of which are hereby incorporated by reference in their entirety.

FIELD OF THE INVENTION

The present invention relates to database operations and, more specifically, to techniques for performing frequent itemset operations.

BACKGROUND OF THE INVENTION

It is common for a data item that is stored in a database to have a logical relationship with other data items that are stored in the database. A set of data items that are related to each other is referred to herein as an "item group". An example of an item group is the set of all data items related to a particular employee (such as name, age, salary, etc.). Another example of an item group is the set of all data items that were purchased in a particular transaction (such as apples, bananas, and grapes).

A set of similar item groups is referred to herein as an "item group population". Relational database systems are frequently used to store information about large item group populations. For example, a relational database system may be used to store information about all employees of a company. As another example, a relational database system may be used to store information about all sales transactions made at a given store, or at a large chain of stores.

Relational database systems are not only used to store information, but also to gather valuable intelligence based on the information that they store. For example, the management of a chain of stores may perform operations on the sales transaction information stored in a relational database to determine which stores are making the most sales, and which regions of the country are interested in particular products.

The most direct way to perform operations on data that is managed by a relational database server is to issue commands to the database server, where the commands specify the desired operations. In response to the commands, the relational database performs the desired operations and returns the results to the entity that issued the commands.

Of course, for the database server to execute the commands, the commands must conform to the database language that is supported by the database server. One database language that is supported by most relational database servers is SQL. Unfortunately, there is a limit to the type of operations that SQL directly supports. Operations that are not directly supported by SQL may be performed by specifying a series of SQL operations which, when executed in combination with each other, perform the desired unsupported operation.

Depending on the nature of the unsupported operation, the combination of SQL operations required to perform the unsupported operation may be quite complex. Further, amount of time and resources required to execute the series of operations may make the use of SQL impractical. Under these circumstances, it is often more efficient to simply export the data from the database and execute a software program specially designed to perform the desired operation on the expected data. If further operations are to be performed on the results of the operation, then the results of the operation may be imported back into the database.

An example of a type of operation that, in general, cannot be performed efficiently using SQL operations is a frequent itemset operation. A frequent itemset operation is an operation that identifies which sets of items occur together most frequently in a particular item group population. For example, assume that a database stores information about sales transactions for a fruit market that sells apples, bananas and grapes. Assume further that ten percent of the sales transactions involve apples and bananas, that fifty percent of the sales transactions involve apples and grapes, and that ninety percent of the sales transactions involve grapes and bananas. If the frequent itemset operation uses a "frequency threshold" of seventy percent, then the results of the frequent itemset operation would include the itemset (grapes, bananas) but would exclude the itemsets (apples, grapes) and (apples, bananas). On the other hand, if the frequent itemset operation uses a frequency threshold of forty percent, then the results of the frequent itemset operation would include the itemsets (grapes, bananas) and (apples, grapes) but not the itemset (apples, bananas).

When performed using available SQL operations, frequent itemset operations typically require, among other things, so many join operations that performance is frequently unacceptable when the operation involves any sizable item group population. Consequently, for large item group populations, the technique of exporting the data from the database, performing the operation outside the database, and importing the results of the operation back into the database, may be the only acceptable alternative.

Based on the foregoing, it is desirable to provide a technique for performing frequent itemset operations in a manner that reduces the performance problems and the import/export hassle associated with the current techniques.

SUMMARY

Techniques are provided for (1) extending SQL to support direct invocation of frequent itemset operations, (2) improving the performance of frequent itemset operations by clustering itemset combinations to more efficiently use previously produced results, and (3) making on-the-fly selection of the occurrence counting technique to use during each phase of a multiple phase frequent itemset operation. When directly invoked in an SQL statement, a frequent itemset operation may receive input from results of operations specified in the SQL statement, and provide its results directly to other operations specified in the SQL statement. By clustering itemset combinations, resources may be used more efficiently by retaining intermediate information as long as it is useful, and then discarding it to free up volatile memory. Dynamically selecting an occurrence counting technique allows a single frequent itemset operation to change the occurrence counting technique that it is using midstream, based on cost considerations and/or environmental conditions.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a block diagram of a table that stores item groups according to a multiple-items-per-row format;

DETAILED DESCRIPTION OF THE INVENTION

Techniques and systems are provided for performing frequent itemset operations. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Techniques are provided for (1) extending SQL to support direct invocation of frequent itemset operations, (2) improving the performance of frequent itemset operations by clustering itemset combinations to more efficiently use previously produced results, and (3) making on-the-fly selection of the occurrence counting technique to use during each phase of a multiple phase frequent itemset operation.

Multiple-Items-Per-Row Format Item Group Populations

Item group populations may be stored in any one of a variety of formats. According to one such format (referred to herein as the "multiple-items-per-row format"), the item group population is stored in a table, where each row of the table is associated with an item group, and
each row of the table stores values that identify the members of the item group associated with the row.

An example of an item group population stored in the multiple-items-per-row format is illustrated in FIG. 1. Referring to FIG. 1, a table 100 stores data for an item group population that includes three item groups. Each of the three rows (102, 104 and 106) of table 100 corresponds to an item group. For the purpose of explanation, the item groups associated with rows 102, 104 and 106 shall be referred to herein as item groups t1, t2 and t3, respectively.

Single-Item-Per-Row Format Item Group Populations

Another format (referred to herein as the "single-item-per-row format") for storing an item group population involves storing the item group population in a two-column table, where for each row one column identifies an item group, and
the other column identifies one of the items in the item group.

Figure 2:
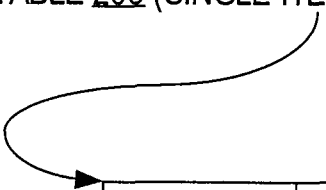
FIG. 2 is a block diagram of a table that stores item groups according to a single-item-per-row format.

Since each row only identifies one item of an item group, an item group with N items will be represented by N rows. An example of an item group population stored in the single-item-per-row format is illustrated in FIG. 2. Referring to FIG. 2, table 200 includes data representing the same item group population as is represented in table 100 of FIG. 1. However, in table 200, each row only identifies one (item group, item) association. Thus, item group t2, which contains three items, is represented in three rows.

Other Formats for Storing Item Group Populations

The multiple-items-per-row and single-item-per-row formats for storing item group populations, respectively illustrated in FIGS. 1 and 2, are merely two examples of a virtually unlimited number of ways item group population information may be represented. The techniques described herein are not limited to any particular representation format. However, regardless of the format used, information about the format is known by or communicated to the database server to enable the database server to know how to process the information to perform frequent itemset operations.

An embodiment shall be described hereafter in which the database server understands both the multiple-items-per-row and single-item-per-row formats, and includes routines for receiving the item group information from each of the different formats. In embodiments that support multiple formats, the database statement that requests the performance of a frequent itemset operation may be used as the mechanism to communicate to the database server which input format to expect. Since the most widely used database language, SQL, does not have support for directly specifying a frequent itemset operation, nor for indicating an input format for the operation, extensions to the SQL syntax are described hereafter for allowing database commands to include this information.

SQL Support for Frequent Itemset Operations

According to one aspect of the invention, a system is provided that includes a database server capable of handling database commands that directly specify frequent itemset operations. According to one embodiment, the database server is configured to recognize, within a database statement that otherwise conforms to SQL, an SQL extension that specifies a frequent itemset operation. When executing the database statement, the database server performs the frequent itemset operation using an item group population specified in the SQL statement. According to one embodiment, the item group population may itself be a database statement (e.g. an SQL statement) of arbitrary complexity. In addition, the results produced by the frequent itemset operation may be further manipulated by the database statement.

For embodiments that support different input formats for the item group population, the SQL extension includes a mechanism for designating the specific format of the input item group population. According to one embodiment, the database server includes direct support for frequent itemset operations, where SQL is extended to include table functions for directly invoking frequent itemset operations;
support is provided for item group population input in both the single-item-per-row format and the multiple-items-per-row format; and the input item group population format is indicated by the name of the table function specified in the SQL statement.

The syntax, parameters and use of such table functions are explained in greater detail hereafter. However, those details merely provide an example of how SQL may be extended to provide direct support for frequent itemset operations. In alternative embodiments, frequent itemset operations may be directly specified using database language constructs other than table functions. Further, the specific syntax and parameters of the table functions may vary from implementation to implementation in embodiments that extend SQL to include table functions for direct frequent itemset operation support.

Table Function for Single-Item-Per-Row Format Input

According to one embodiment, direct support for frequent itemset operations is provided by a database server configured to properly parse and execute SQL statements that support a table function named "FREQUENT ITEMSET_Transactional". The FREQUENT ITEMSET_Transactional function counts all frequent itemsets given a cursor for input data that is in the single-item-per-row format.

According to one embodiment, the table function for single-item-per-row format input has the following syntax:

```
FUNCTION FI_Transactional(
    tranx_cursor SYSREFCURSOR,
    support_threshold NUMBER,
    itemset_length_min NUMBER,
    itemset_length_max NUMBER,
    including_items SYSREFCURSOR,
    excluding_items SYSREFCURSOR)
RETURN TABLE OF ROW(
    itemset [Nested Table of Item Type DERIVED FROM tranx-cursor],
    support NUMBER,
    length NUMBER,
    total_tranx NUMBER);
```

The syntax example given above indicates support for a variety of parameters. According to one embodiment, those parameters are used as follows:

tranx_cursor(IN): The cursor parameter that the user will supply when calling the function. It should return two columns in its returning row, the first column being an item group id, the second column being an item id.

support_threshold(IN): A fractional number. An itemset is called frequent if the number of transactions it occurs in divided by the total number of transactions exceeds the fraction. The parameter must be a NUMBER.

itemset_length_min(IN): Minimum length for interested frequent itemsets. The parameter must be a NUMBER.

Itemset_length_max(IN): Maximum length for interested frequent itemsets. This parameter must be a NUMBER.

including_items (IN): A cursor from which a list of items can be fetched. At least one item from the list should appear in frequent itemsets that will be returned.

excluding_items(IN): A cursor from which a list of items can be fetched. No item from the list can appear in frequent itemsets that will be returned.

support(OUT): number of transactions in which a frequent itemset occurs. This will be returned as a NUMBER.

itemset(OUT): A collection of items which is computed to be frequent. This will be returned as a nested table of an item type which is the item column type of the input cursor.

length(OUT): Number of items in a frequent itemset. This will be returned as a NUMBER.

total_tranx(OUT): Total transaction count. This will be returned as a NUMBER.

The FI_Transactional function's behavior is illustrated with the following example. Suppose that the input table tranx_table_in contains the data illustrated in table 200 of FIG. 2. Assume further that the user is trying to find itemsets that satisfy a support-threshold of 60% and have an itemset-length greater than 1 (namely, (apple, banana)).

itemset=(apple, banana), support=2, length=2, total_tranx=3

The following illustrates how the FI_Transactional function may be used in an otherwise standard SQL query to satisfy the user request:

```
select itemset, support, length, total_tranx
    from table(sys.dbms_frequent_itemset.fi_transactional(
        cursor(select tid, iid from tranx_table_in),
        0.6, 2, 5,
        NULL, NULL));
```

Applications can predefine a nested table type of the given input item type and cast itemset into the predefined type before further processing (e.g. loading into a table).

The following example illustrates how to include certain items and exclude certain items in the counting.

```
select itemset, support, length, total_tranx
    from table(sys.dbms_frequent_itemset.fi_transactional(
        cursor(select tid, iid from tranx_table_in_IF1),
        0.6, 2, 5,
        cursor(select * from table(sys.ora_fi_char_nt(apple, banana))),
        cursor(select * from table(sys.ora_fi_char_nt(milk, orange)))));
```

Using the including/excluding items parameter, the execution of the statement can be optimized by ignoring itemsets that are not desired by the application.

Table Function for Multiple-Items-Per-Row Format Input

According to one embodiment, direct support for frequent itemset operations is provided by a database server configured to properly parse and execute SQL statements that support a table function named "FI_Horizontal". The FI_Horizontal function counts all frequent itemsets given a cursor for input data that is in the multiple-items-per-row format. According to one embodiment, the syntax for the FI_Horizontal function is:

```
FUNCTION FI_Horizontal(
    tranx-cursor SYSREFCURSOR,
    support-threshold NUMBER,
```

```
    itemset-length-min NUMBER,
    itemset-length-max NUMBER,
    including-items SYSREFCURSOR,
    excluding-items SYSREFCURSOR)
    RETURN TABLE OF ROW(
    itemset [Nested Table of Item Type DERIVED FROM tranx-cursor],
    support NUMBER,
    length NUMBER,
    total_tranx NUMBER);
```

The syntax example given above indicates support for a variety of parameters. According to one embodiment, those parameters are used as follows:

tranx_cursor(IN): The cursor parameter that the user will supply when calling the function. Each non-null column of the cursor represents a an item. All columns of the cursor have the same data type.

support_threshold(IN): A fractional number. An itemset is called frequent if the number of transactions it occurs in divided by the total number of transactions exceeds the fraction. The parameter must be a NUMBER.

itemset_length_min(IN): Minimum length for interested frequent itemsets. The parameter must be a NUMBER.

Itemset_length_max(IN): Maximum length for interested frequent itemsets. This parameter must be a NUMBER.

including_items (IN): A cursor from which a list of items can be fetched. At least one item from the list should appear in frequent itemsets that will be returned.

excluding_items(IN): A cursor from which a list of items can be fetched. No item from the list can appear in frequent itemsets that will be returned.

support(OUT): number of transactions in which a frequent itemset occurs. This will be returned as a NUMBER.

itemset(OUT): A collection of items which is computed to be frequent. This will be returned as a nested table of an item type which is the item column type of the input cursor.

length(OUT): Number of items in a frequent itemset. This will be returned as a NUMBER.

total_tranx(OUT): Total transaction count. This will be returned as a NUMBER.

The following example illustrates how to use this function for data that is stored in the 'multiple-items-per-row' format. For the purpose of illustration, assume that a table horiz_table_in contains the columns and data illustrated in table 100 of FIG. 1. Further assume that a user wishes to find out what combinations of items are frequent with a given support threshold of 30%, requiring itemsets containing at least one of (apple, banana), but excluding any of (milk, orange) in any itemset. This information can be obtained by issuing the following SQL query:

```
select itemset, support, length, total_tranx
from table(sys.dbms_frequent_itemset.fi_horizontal(
    cursor(select iid1, iid2, iid3, iid4, iid5
       from horiz_table_in),
         0.3, 2, 5,
         cursor(select * from table(sys.ora_fi_number_nt(apple,
            banana))),
         cursor(select * from table(sys.ora_fi_number_nt(milk,
            orange)))));
```

The benefit of this table function is that if the application already has data in multiple-items-per-row format, the database can skip the step of transforming rows from the single-item-per-row format into the multiple-items-per-row format.

Performing Frequent Itemset Operations

When a database server receives a database statement, the database parses the database statement to determine the operations that the statement requires. To execute the statement, the database server must then perform those operations. Thus, for a database server to be able to handle statements that specify frequent itemset operations, the database server must be able to perform frequent itemset operations, and not merely be able to detect when a database statement specifies a frequent itemset operation.

There are many techniques that a database server may use to perform frequent itemset operations. However, not all techniques can be performed as efficiently as others. As shall be described in greater detail hereafter, a technique is provided for arranging the order in which itemsets are processed during a frequent itemset operation, such that the itemsets are clustered in a manner that makes more efficient use of available resources.

Multi-Phase Candidate Elimination

During a frequent itemset operation, the database server determines which of the frequent itemset candidates qualify as frequent itemsets, and which ones are disqualified for failing to satisfy a condition of the frequent itemset operation. At the start of a frequent itemset operation, every possible combination of items is considered to be a frequent itemset candidate. Candidates are then eliminated, as it is determined that they fail to satisfy a condition of the frequent itemset operation.

According to one embodiment, the candidate elimination process is performed in phases, where each phase focuses on itemset candidates that have a particular number of items. For example, the first phase focuses on itemset candidates that have one item. The second phase focuses on itemset candidates that have two items. The elimination process continues until no unclassified candidates remain, or until all itemset candidates that have M items have been processed, where M is the maximum itemset size specified in the database statement.

According to one embodiment, during the Nth phase, not every possible combination of N items is considered as a candidate. Rather, the results of the N−1 phase are used to compute which N-item combinations are candidates. For example, assume that, during the third phase it is determined that the combination (a, b, c) is not a frequent itemset because it does not satisfy the frequency criteria. If (a, b, c) does not satisfy the frequency criteria, then it is not possible for any four-item combination that includes (a, b, c) to satisfy the frequency criteria. Consequently, the initial set of candidates for the Nth phase are generated based on only the combinations that satisfied the frequency criteria during the N−1 phase.

According to one embodiment, an N-item combination is only considered as a candidate if all of its N−1 combination satisfy the frequency criteria.

Using Bitmaps to Identify Frequent Itemsets

A candidate combination is not a resultant frequent itemset if (1) the candidate does not occur as frequently as required by the specified frequency threshold, or (2) the candidate fails to meet some other condition specified for the operation (e.g. the candidate has fewer members than the specified minimum, or the candidate does not include a particular item that must be included). One technique to determine whether a particular candidate satisfies a frequency threshold involves (1) creating a bitmap for each possible item, (2) performing a Boolean AND operation between the single-item bitmaps to create a bitmap that represents the candidate combination, (3) determining how many item groups include the combination based on the bitmap of the combination, and (4) determining whether the candidate combination satisfies the frequency threshold based on the number of item groups that include the combination.

Figure 3:
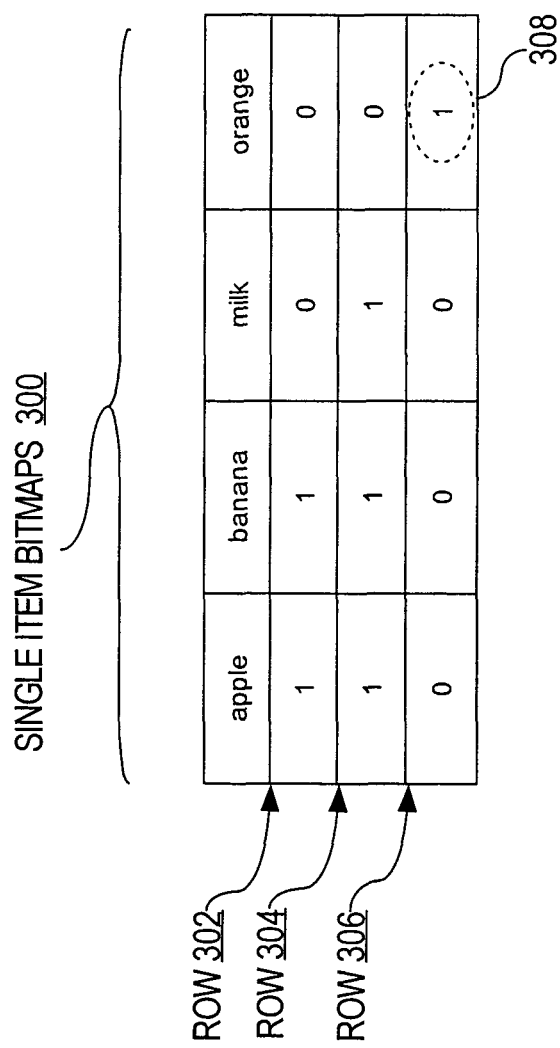
FIG. 3 is a block diagram illustrating a set of single-item bitmaps, according to an embodiment of the invention.

FIG. 3 is a diagram of a table of single item bitmaps 300. In the illustrated table, each item has a corresponding column, and each item group has a corresponding row. The intersection of a row and column of the table constitutes a cell. The value stored in a given cell indicates whether the item group associated with the row includes the specific item associated with the column.

For example, rows 302, 304 and 306 are respectively associated with item groups t1, t2 and t3. The columns of the table are associated with items "apple", "banana", "milk", and "orange". Cell 308, which is at the intersection of row 306 and column "orange" contains a "1" to indicate that the item "orange" is included in the transaction t3 associated with row 306.

The string of values in the column associated with an item constitutes the bitmap for that item. For example, the apple column of rows 302, 304 and 306 respectively store the values "1", "1" and "0". Consequently, the bitmap for "apple" is "110". Similarly, the bitmap for "banana" is "110", the bitmap for "milk" is "010" and the bitmap for "orange" is "001".

For the purpose of explanation, the notation B(a, b, c) will be used herein to indicate the bitmap for the combination that consists of items a, b, and c. Thus, based on the table illustrated in FIG. 3, B(apple) is "110" and B(orange) is "001".

The bitmap for a multi-item combination may be generated by performing an AND operation between the bitmaps for the individual items in the combination. For example, B(apple, milk) may be generated by performing an AND between the B(apple) "110" and B(milk) "010". In this example, the resulting bitmap B(apple, milk) is "010". Similarly, the bitmaps for one or more smaller combinations may be ANDed together to produce the bitmap for a larger combination. For example, the bitmap B(apple, milk) "010" may be ANDed with the bitmap B(banana) "001" to produce the bitmap B(apple, milk, banana) "000".

Each value in a bitmap for a combination indicates whether the combination exists (is "TRUE") or does not exist (is "FALSE") in a given item group. Therefore, the total number of TRUE indications in a bitmap indicates how many item groups in the item group population include the combination associated with the bitmap. In the table illustrated in FIG. 3, the value "1" is used to indicate TRUE. Thus, the bitmap "010" for the combination (apple, milk) indicates that only one item group in the relevant population has the combination (apple, milk). Similarly, the bitmap "000" for the combination (apple, milk, banana) indicates that no item group in the relevant population has the combination (apple, milk, banana).

Bitmap Proliferation

Because the bitmaps of smaller combinations can be combined to create the bitmaps for larger combinations, various techniques are described herein in which the phases of a frequent itemset operation begin with a single-item phase and proceed to phases for progressively larger combinations. For example, during the first phase, bitmaps are made for single-item combinations. During the second phase, the single-item bitmaps are used to make bitmaps for two-item combinations. During the third phase, the two-item bitmaps are combined to make bitmaps for three-item combinations.

Unfortunately, due to the amount of resources that retention of the bitmaps would require, it is rarely efficient to retain all bitmaps from previously-processed combinations. This is particularly true for item group populations that include large numbers of item groups (thereby increasing the size of each bitmap) and large numbers of possible items (thereby greatly increasing the number of combinations).

Clustering Combinations

As explained above, the bitmap of a multiple-item combination may be generated by combining two or more lower-ordered bitmaps. The lower-ordered bitmaps that can be used to generate the bitmap of a multiple-item combination are referred to herein as the "base bitmaps" of the multiple-item combination. According to one embodiment, the problem of bitmap proliferation is reduced by (1) clustering the candidate combinations that are to be processed during a phase, and (2) selectively discarding bitmaps after processing the cluster(s) to which the bitmaps apply.

As used herein, the term "cluster" refers to a set of combinations that have a base bitmap in common. The base bitmap that all combinations in a particular cluster have in common is referred to herein as the "cluster bitmap" for that cluster. For example, consider the combinations (a, b, c, d), (a, b, c, e), (a, b, c, f), (a, m, n, o), (a, m, n, p), (a, m, n, q). These combinations can be separated into a first cluster that includes (a, b, c, d), (a, b, c, e), (a, b, c, f), and a second cluster that includes (a, m, n, o), (a, m, n, p), (a, m, n, q). In this example, all combinations in the first cluster include the combination (a, b, c). Thus, the bitmap B(a, b, c) is the cluster bitmap for the first cluster. Similarly, all combinations in the second cluster include the combination (a, m, n). Thus, the bitmap B(a, m, n) is the cluster bitmap for the second cluster.

As shall be illustrated in greater detail hereafter, the concept of clustering is multi-layered. For example, all combinations that include the prefix (a, b, c, . . . ) may be considered a first cluster, and all combinations that include the prefix (a, b, . . . ) may be considered a second cluster, where the second cluster is a superset of the first cluster.

By processing combinations in a sequence that is based on clusters, it is possible to know when cluster bitmaps can be discarded. For example, the cluster bitmap B(a, b, c) may be discarded after being used to generate the bitmaps for the combinations that belong to the first cluster. Similarly, the cluster bitmap B(a, m, n) may be discarded after being used to generate the bitmaps for the combinations that belong to the second cluster.

Various techniques may be used to cluster the combinations that are being processed at a particular phase of a frequent itemset operation. For example, according to one embodiment, the items within a combination are sorted based on some ordering criteria, and then the combinations themselves sorted relative to each other based on the same ordering criteria. For example, assume that the combinations are (m, a, n, q), (d, b, c, a), (o, m, n, a), (a, e, c, b), (c, b, a, f), (a, m, n, p). Further assume that the sorting is performed based on alphabetic order. Under these circumstances, sorting the items within each combination would result in the combinations (a, m, n, q), (a, b, c, d), (a, m, n, o), (a, b, c, e), (a, b, c, f), (a, m, n, p). After the items within each combination are sorted, the combinations themselves are sorted relative to each other, resulting in the sequence: (a, b, c, d), (a, b, c, e), (a, b, c, f), (a, m, n, o), (a, m, n, p), (a, m, n, q). Significantly, in the resulting sequence, the combinations with the base bitmap B(a, b, c) are clustered together, and the combinations with the base bitmap B(a, m, n) are clustered together.

Another technique for clustering combinations involves hashing the combinations into buckets based on sub-combinations. For example, all combinations that include items a, b and c may be hashed into one bucket, while all combinations that include items a, m and n may be hashed into another bucket. All of the combinations that fall into a particular bucket constitute a cluster, where the bitmaps of the combination used to establish the bucket are the cluster bitmaps for the cluster. For example, if all combinations that include a, b and c are hashed to a bucket X, then the bitmap B(a, b, c) would be the cluster bitmap for the cluster that consists of the combinations that have been hashed to bucket X.

Temporarily Reteining Cluster Bitmaps

According to one embodiment, only single-item bitmaps are retained between phases. Cluster bitmaps, on the other hand, are created prior to processing the clusters with which they are associated, and discarded after processing all combinations in the clusters with which they are associated. According to one embodiment, all other bitmaps are discarded as soon as they have been used to determine whether the corresponding combination satisfies the frequency criteria.

For example, assume that (a, b, c, d), (a, b, c, e), (a, b, c, f), (a, m, n, o), (a, m, n, p), and (a, m, n, q) are the candidates at the outset of the four-item combination phase. Initially, the only pre-existing bitmaps are the single-item bitmaps. In this example, the first cluster, which includes the combinations (a, b, c, d), (a, b, c, e), (a, b, c, f), is associated with the cluster bitmap B(a, b, c). Thus, prior to processing the first cluster, the bitmap B(a, b, c) is generated from the single-item bitmaps, and then used along with the single-item bitmaps to generate the bitmaps for each of the combinations in the first cluster.

When a bitmap is generated for a combination in the first cluster, the bitmap is used to determine whether the combination satisfies the frequency threshold, and is then discarded. After all of the combinations in the first cluster have been evaluated, the bitmap B(a, b, c) is also discarded.

At this point, the cluster bitmap B(a, m, n) is created for the second cluster, and then used along with the single-item bitmaps to generate the bitmaps for each of the combinations in the second cluster. After all of the combinations in the second cluster have been evaluated, the bitmap B(a, m, n) is discarded.

Retaining Base Bitmaps

In the example given above, cluster bitmaps are retained until all combinations in their corresponding cluster have been evaluated. According to one embodiment, all intermediary bitmaps that are generated to evaluate a given combination are also retained, as long as such intermediary bitmaps continue to be base bitmaps of the combination that is being evaluated.

Figure 4:
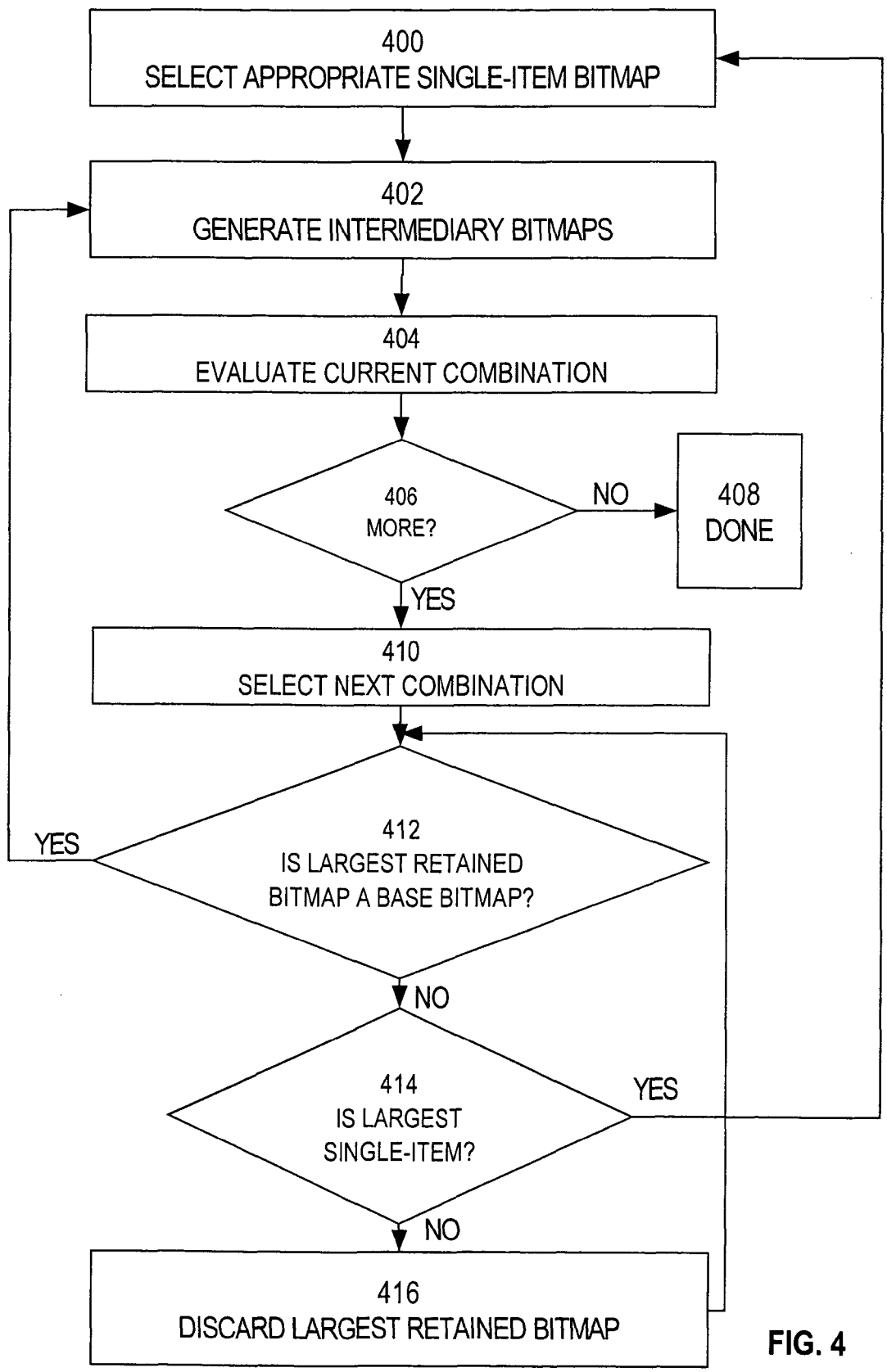
FIG. 4 is a flowchart illustrating steps for managing bitmaps during a phase of a frequent itemset operation, according to an embodiment of the invention.

FIG. 4 is a flowchart showing steps for evaluating combinations, according to an embodiment where intermediary bitmaps are retained as long as they are base bitmaps of the combination being evaluated. For the purpose of explanation, it shall be assumed that (a, b, c, d), (a, b, c, e), (a, b, c, f), (a, b, n, o), (a, m, n, p), and (a, m, n, q) are the candidates at the outset of the four-item combination phase. At step 400, the appropriate single-item bitmap is selected for evaluating the first combination (a, b, c, d). Since the first combination is (a, b, c, d), the single-item bitmap B(a) will initially be selected.

In step 402, the intermediary bitmaps necessary to evaluate the current combination are generated. In the present example, the intermediary bitmaps that are generated to evaluate the combination (a, b, c, d) include B(a, b) and B(a, b, c). In step 404, the current combination (a, b, c, d) is evaluated by combining the largest retained bitmap B(a, b, c) with the appropriate single value bitmap B(d). After (a, b, c, d) has been evaluated, it is determined whether there are any more combinations to be processed (step 406). If not, then the current phase is done (step 408).

In the present example, more combinations need to be processed, so control passes to step 410. At step 410, the next combination (a, b, c, e) is selected. At step 412, it is determined whether the largest retained bitmap B(a, b, c) is a base bitmap of the current combination (a, b, c, e). In the present example, the largest retained bitmap B(a, b, c) is a base bitmap of (a, b, c, e). Therefore, no retained bitmap is discarded, and control passes to step 402. In step 402, any necessary intermediary bitmaps are generated to evaluate (a, b, c, e). In the present example, the largest retained bitmap is only one item smaller than the combination being evaluated, so no intermediary bitmaps need to be generated. At step 404, the largest retained bitmap B(a, b, c) is used to evaluate the combination (a, b, c, e).

After (a, b, c, e) has been evaluated, it is determined whether there are any more combinations to be processed (step 406). If not, then the current phase is done (step 408).

In the present example, more combinations need to be processed, so control passes to step 410. At step 410, the next combination (a, b, c, f) is selected. At step 412, it is determined whether the largest retained bitmap B(a, b, c) is a base bitmap of the current combination (a, b, c, e). In the present example, the largest retained bitmap B(a, b, c) is a base bitmap of (a, b, c, f). Therefore, no retained bitmap is discarded, and control passes to step 402. In step 402, any necessary intermediary bitmaps are generated to evaluate (a, b, c, f). In the present example, the largest retained bitmap is only one item smaller than the combination being evaluated, so no intermediary bitmaps need to be generated. At step 404, the largest retained bitmap B(a, b, c) is used to evaluate the combination (a, b, c, f).

After (a, b, c, f) has been evaluated, it is determined whether there are any more combinations to be processed (step 406). If not, then the current phase is done (step 408).

In the present example, more combinations need to be processed, so control passes to step 410. At step 410, the next combination (a, b, n, o) is selected. At step 412, it is determined whether the largest retained bitmap B(a, b, c) is a base bitmap of the current combination (a, b, n, o). In the present example, the largest retained bitmap B(a, b, c) is not a base bitmap of (a, b, n, o). Therefore, control passes to step 414.

In step 414, it is determined whether the largest retained bitmap is a single-item bitmap. In the present example, the largest retained bitmap B(a, b, c) is not a single-item bitmap, so control passes to step 416 and the largest retained bitmap is discarded. After discarding the bitmap B(a, b, c), the largest retained bitmap is the bitmap B(a, b). At step 412, it is determined whether the largest retained bitmap B(a, b) is a base bitmap of (a, b, n, o). In the present example, B(a, b) is a base bitmap of (a, b, n, o), so control passes to step 402.

In step 402, any necessary intermediary bitmaps are generated to evaluate (a, b, n, o). In the present example, the bitmap B(a, b, n) is generated. Consequently, the largest retained bitmap is the bitmap B(a, b, n). At step 404, the largest retained bitmap B(a, b, n) is used to evaluate the combination (a, b, n, o).

After (a, b, n, o) has been evaluated, it is determined whether there are any more combinations to be processed (step 406). If not, then the current phase is done (step 408).

In the present example, more combinations need to be processed, so control passes to step 410. At step 410, the next combination (a, m, n, p) is selected. At step 412, it is determined whether the largest retained bitmap B(a, b, n) is a base bitmap of the current combination (a, m, n, p). In the present example, the largest retained bitmap B(a, b, n) is not a base bitmap of (a, m, n, p). Therefore, control passes to step 414.

In step 414, it is determined whether the largest retained bitmap is a single-item bitmap. In the present example, the largest retained bitmap B(a, b, n) is not a single-item bitmap, so control passes to step 416 and the largest retained bitmap is discarded. After discarding the bitmap B(a, b, c), the largest retained bitmap is the bitmap B(a, b).

At step 412, it is determined whether the largest retained bitmap B(a, b) is a base bitmap of the current combination (a, m, n, p). In the present example, the largest retained bitmap B(a, b) is not a base bitmap of (a, m, n, p). Therefore, control passes to step 414.

In step 414, it is determined whether the largest retained bitmap is a single-item bitmap. In the present example, the largest retained bitmap B(a, b) is not a single-item bitmap, so control passes to step 416 and the largest retained bitmap is discarded. After discarding the bitmap B(a, b), the largest retained bitmap is the bitmap B(a).

At step 412, it is determined whether the largest retained bitmap B(a) is a base bitmap of the current combination (a, m, n, p). In the present example, the largest retained bitmap B(a) is a base bitmap of (a, m, n, p). Therefore, no retained bitmap is discarded, and control passes to step 402. In step 402, any necessary intermediary bitmaps are generated to evaluate (a, m, n, p). In the present example, the intermediary bitmaps B(a, m) and B(a, m, n) are generated. At step 404, the largest retained bitmap B(a, m, n) is used to evaluate the combination (a, m, n, p).

After (a, m, n, p) has been evaluated, it is determined whether there are any more combinations to be processed (step 406). If not, then the current phase is done (step 408).

In the present example, more combinations need to be processed, so control passes to step 410. At step 410, the next combination (a, m, n, q) is selected. At step 412, it is determined whether the largest retained bitmap B(a, m, n) is a base bitmap of the current combination (a, m, n, q). In the present example, the largest retained bitmap B(a, m, n) is a base bitmap of (a, m, n, q). Therefore, no retained bitmap is discarded, and control passes to step 402. In step 402, any necessary intermediary bitmaps are generated to evaluate (a, m, n, q). In the present example, the largest retained bitmap is only one item smaller than the combination being evaluated, so no intermediary bitmaps need to be generated. At step 404, the largest retained bitmap B(a, m, n) is used to evaluate the combination (a, m, n, q).

After (a, m, n, q) has been evaluated, it is determined whether there are any more combinations to be processed (step 406). Because (a, m, n, q) was the last 4-item candidate, the current phase is done (step 408). According to one embodiment, at the end of each phase, all of the retained bitmaps are discarded, except the single-item bitmaps.

Storing Bitmaps in Indexes

In most computing environments, volatile memory is smaller but faster than non-volatile memory. Thus, to improve the speed of frequent itemset operations, all of the bitmaps that are generated during a frequent itemset operation may be maintained in volatile memory. However, even large systems may not have enough volatile memory to maintain all data involved in a frequent itemset operation in volatile memory.

According to one embodiment, the results of each phase are written to non-volatile memory. During a subsequent phase, the results of a previous phase are loaded from non-volatile memory into volatile memory as those results become needed in the subsequent phase.

When non-volatile memory is used for bitmap retention, some or all of the bitmaps that are generated during one phase of a frequent itemset operation may be stored in an index in non-volatile memory. According to one embodiment, the bitmaps of all N-item combinations that satisfied the frequency criteria are stored in a non-volatile index so that they can be later used to create the bitmaps for N+1-item combinations.

The combination associated with a bitmap may be used as the index key for determining where within the index to place the entry for the bitmap. According to one embodiment, a bitmap index is used to store the bitmaps. Each entry within the bitmap index is associated with a combination, and includes the bitmap for the combination. Within the bitmap index, the bitmaps may be compressed to preserve space. In addition, when a stored bitmap is needed during a frequent itemset operation, it is possible to load selected portions of the bitmap into volatile memory, rather than the entire bitmap.

Various techniques for processing bitstrings that are stored in a bitmap index are described in U.S. Pat. Nos. 6,067,540, 6,141,656, 5,899,988, 5,884,307, 5,907,297 5,963,935, 6,195,656, 6,205,442, and 6,266,662, the contents of which are incorporated herein by this reference. These and other such bitmap handling techniques may be used to increase the efficiency and decrease the resource usage of bitmap indexes that are used to store previously-generated bitmaps for frequent itemset operations.

By using the clustering techniques described above, the amount of I/O between volatile and non-volatile memory required during a frequent itemset operation is significantly reduced. For example, when the frequent itemset operation begins to evaluate the combinations that belong to a cluster, the database server traverses the bitmap index to locate the index entry for the appropriate cluster bitmap, and reads the cluster bitmap into volatile memory. The cluster bitmap is then used to evaluate all of the combinations in the cluster, and is then discarded from volatile memory. Thus, by clustering the combinations and using the cluster bitmap, it is not necessary to retrieve a new bitmap from the bitmap index every time a new combination is being evaluated.

Prefix Tree Counting

In the previous sections, the number of occurrences of a combination is determined by (1) generating a bitmap for the combination, and then (2) counting the TRUE values in the bitmap. Once the number of occurrences of the combination is determined, whether the combination satisfies the frequency criteria may be determined based on the number of occurrences, the total number of item groups in the item group population, and the frequency threshold. The technique of determining the number of occurrences of a combination based on the bitmap for the combination is referred to herein as the bitmap intersection technique.

Various other techniques may be used to determine the number of occurrences of a combination. For example, an alternative technique is referred to herein as the prefix tree counting technique. When executing the prefix tree counting technique, at the start of a phase, the database server builds a "prefix tree" based on the candidates for that phase. The tree is N levels deep, where N is the number of items in the combinations that are being considered during the phase. Each node in the tree is associated with an item.

For example, assume that the candidates at the beginning of a three-item phase are:
1. {apple, banana, milk}
2. {apple, banana, orange}
3. {apple, milk, orange}
4. {banana, milk, orange}

Figure 5A:
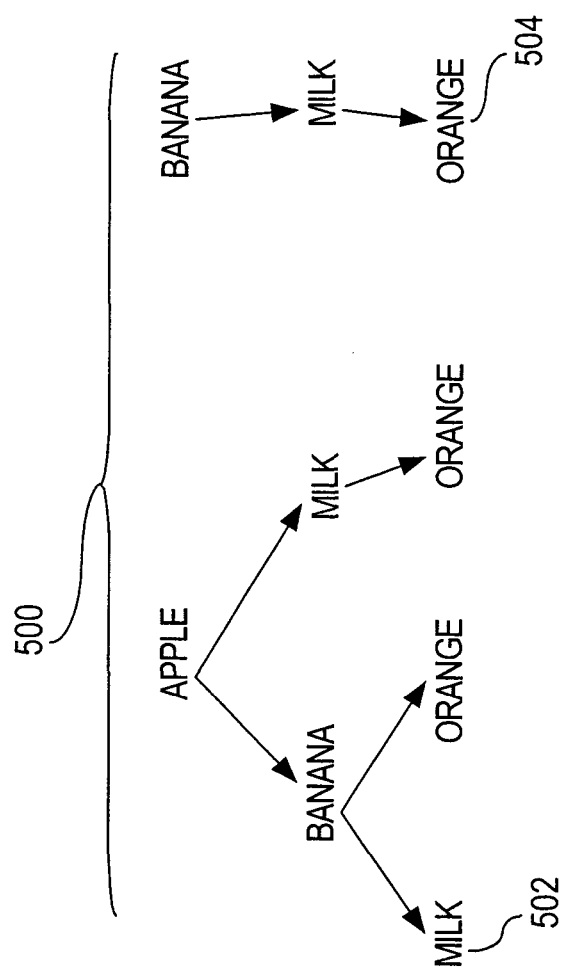
FIG. 5A is a block diagram of a prefix tree used for counting occurrences of combinations, according to an embodiment of the invention.

Based on these candidates, the prefix tree 500 in FIG. 5a may be generated. Each leaf node of the tree represents an N-item combination that includes (1) the item associated with the leaf node and (2) the items associated with the nodes that must be traversed to reach the leaf node. For example, leaf node 502 represents the combination (apple, banana milk), while leaf node 504 represents the combination (banana, milk, orange).

Once the prefix tree has been established, the database server then iterates through each item group in the population, incrementing counters at each leaf node that represents a combination of the item group. For example, assume that the item group population consists of the item groups:

T1—(apple, banana, milk)
T2—(apple, banana, milk, orange)
T3—(orange)
T4—(banana, milk, orange)
T5—(apple, milk, orange)
T6—(apple, banana, orange)

Item group T1 only contains one three-item combination (apple, banana, milk). Therefore, to process item group T1, the database server traverses tree 500 once based on the combination (apple, banana, milk), and increments a counter associated with the corresponding leaf node (leaf node 502).

Item group T2 includes several three-item combinations, namely (apple, banana, milk), (apple, banana, orange), (apple, milk, orange), and (banana, milk, orange). Consequently, to process item group T2, the database server traverses tree 500 four times. At the end of each traversal, the counter associated with the resulting leaf node is incremented.

Figure 5B:
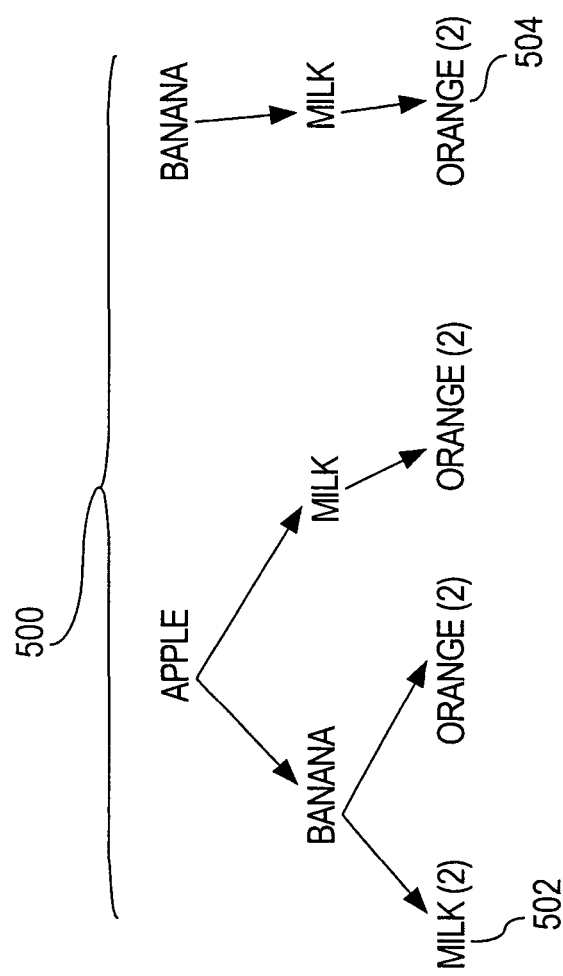
FIG. 5B is a block diagram of the prefix counting tree of FIG. 5A, where the counters associated with the leaf nodes have been incremented based on an item group population.

After every item group has been processed in this manner, the counters associated with each leaf node will indicate the number of occurrences of the combination associated with the leaf node. In the present example, after processing item groups T1 through T6, the counters of prefix tree 500 will have all been incremented to 2, as illustrated in FIG. 5b. Thus, the three-item combination with each of the leaf nodes occurs twice in the item group population.

Dynamic Selection of Counting Technique

The bitmap intersection technique and the prefix tree technique are merely two examples of techniques for counting the number of occurrences of the candidate combinations within the item group population. Other techniques may also be employed. However, the efficiency and performance of any given technique can vary widely based on a variety of factors, including the current workload of the computer system, the amount of resources available (e.g. volatile memory), and numerous other factors that affect the I/O cost and CPU cost of the techniques. Thus, while a first technique may perform vastly superior to a second technique under certain conditions, the second technique may perform vastly superior to the first technique under other conditions.

According to one aspect of the invention, the database server evaluates one or more factors at the start of a phase, and dynamically selects which occurrence counting technique to use during that phase based on those factors. Thus, because the occurrence counting technique is selected on a phase-by-phase basis, it is possible for several different occurrence counting techniques to be used in a single frequent itemset operation. For example, the bitmap intersection technique may be used during the 1-item, 2-item and 5-item phases of an frequent itemset operation. During the 3-item and 6-item phase of the same frequent itemset operation, the prefix tree technique may be used. During the 4-item phase of the same frequent itemset operation, a technique that differs from both the bitmap intersection technique and the prefix tree technique may be used.

Determining Which Occurrence Counting Technique to Use

The determination as to which of several occurrence counting techniques to use during any give phase may take into account a variety of factors. The specific factors, and the weights given to each, may vary from implementation to implementation. The present invention is not limited to any particular occurrence counting techniques, factors, or weights.

According to one embodiment, at the start of a phase of a frequent itemset operation, the database server selects between the bitmap intersection technique and the prefix tree technique based on both the I/O and CPU costs of each. After estimating the two costs for each technique, the two costs are combined with some weighting factors to generate a combined cost for each technique. Finally, the combined costs for the two techniques are compared with each other, and the technique with the lower cost is selected for the current phase of the frequent itemset operation. An example of how I/O costs and CPU costs can be calculated for each of these techniques is described hereafter. However, the actual cost calculations used may vary from implementation to implementation.

Determining I/O Cost for the Prefix Tree Technique

According to one embodiment, the I/O cost for the prefix tree technique is determined based on the formula:

$$IO = \text{transaction\_list\_reading\_cost} * (\text{treeSize}/\text{memSize} + 1)$$

where treeSize indicates the size of the candidate prefix tree, and
memSize indicates the size of the memory that can be used for prefix tree.

Because the entire candidate prefix tree may not fit in memory, the prefix tree can be counted in partitions. Under these circumstances, all the transaction lists are read for each partition of the tree.

Determining I/O Cost for the Bitmap Intersection Technique

According to one embodiment, the I/O cost for the bitmap intersection technique is determined based on the formula:

$$IO = bitmaps\_reading\_cost + index\_access\_cost$$

where index_access_cost=number_index_access*each_bitmap_access_cost, bitmaps_reading_cost is the cost reading all the frequent items' bitmaps,
number_index_access is number of index accesses to get the bitmap in if the bitmap is not in volatile memory, and
each_bitmap_access_cost is for each frequent item's bitmap reading cost.

The bitmap intersection technique may involve index access because there is no guarantee that all the bitmaps can fit in volatile memory. In fact, even the intermediate bitmaps may not all fit in volatile memory. Under these circumstances, the intermediate bitmaps can be dumped to non-volatile memory, and then read in to volatile memory when needed.

Determining CPU Cost of Prefix Tree Technique

According to one embodiment, the CPU cost for the prefix tree technique is determined based on the formula:

$$CPU = tree\_creation\_cost + number\_of\_transactions * tree\_traversal\_cost\_per\_transaction$$

where tree_creation_cost is the cost of creating the prefix tree,
number_of_transactions is the total number of item groups, and
tree_traversal_cost_per_transaction is the cost of traversing the tree with a item group.

The following recursive function is an example of a function by which the tree traversal cost may be estimated:

```
traverse_cost(current_depth, tree_fanout, transaction_length)
{
  if (current_depth = leaf_level_depth) then
  {
    leaf_level_cost := (compare tree_fanout nodes + increment
      counters)
    return leaf_level_cost;
  }
  else
  {
    intermediate_cost := 0;
    for (i := 1; i < transaction_length – current_depth; i++)
    {
      intermediate_cost := (compare tree_fanout/transaction_length
        nodes) + traverse_cost(current_depth – 1, tree_fanout,
          transaction_length – i * tree_fanout/transaction_length);
    }
    return intermediate_cost
  }
}
```

In general, the recursive function determines the leaf node cost by comparing number of tree_fanout nodes' cost and the increment counters' cost. The intermediate node cost is determined by the cost of access all the children nodes and the compare node cost in the intermediate node.

According to one embodiment, an estimate of the traversing cost is determined based on the current_phase, fanout, and average_transaction_length. The cost of traversing an average transaction may be multiplied by the total number of transactions to arrive at a total traversing cost.

Determining the CPU Cost of the Bitmap Intersection Technique

According to one embodiment, the CPU cost for the bitmap intersection technique is determined based on the formula:

$$CPU = number\_of\_intersection * intersection\_cost\_per\_bitmap;$$

where number_of_intersection is the number_of_candidates*rolldown factor,
number_of_intersection is the total number of intersections needed in the rolldown model, and
intersection_cost_per_bitmap is the intersection cost of two bitmaps.

Generating Total Cost Values

According to one embodiment, after both CPU and I/O cost estimates are calculated for each occurrence counting technique, a total cost is generated for each technique. According to one embodiment, the total cost of a technique is determined based on the formula:

$$cmb\_cost = combine\_with\_weight(io\_cost, cpu\_cost)$$

After a combined cost has been determined for each occurrence counting technique, the occurrence counting technique with the lowest estimated cost is chosen as the occurrence counting technique to use for the current phase of the frequent itemset operation.

It should be noted that the specific weights given to each of the constituent costs may vary from implementation to implementation. Further, embodiments that dynamically select an occurrence counting technique on a per-phase basis during a frequent itemset operation are not limited to any specific type of constituent costs, how the constituent costs are determined, nor the relative weights given to the constituent costs.

It should be noted that each occurrence counting technique will typically have a startup cost. For example, for the bitmap intersection technique, single-item bitmaps have to be prepared. In the prefix tree technique, transaction lists have to be prepared. In one embodiment, unnecessary start up costs are avoided by making an initial determination about whether to always use only one of the available occurrence counting techniques. Such a determination may be based, for example, on the number of candidate combinations that may have to be considered during the frequent itemset operation, and the size of the item group population. If it is determined that only one occurrence counting technique will be used during the frequent itemset operation, then the start up costs for the other occurrence counting techniques are avoided.

Various other techniques may be used to avoid or delay start up costs. For example, at the beginning of the frequent itemset operation, it may be determined that only a subset of the available occurrence counting techniques will be considered during the frequent itemset operation. Consequently, the start up costs of only the selected subset of occurrence counting techniques are incurred. Further, the preparations necessary to use a particular technique may be delayed until it becomes clear that the technique will actually be considered or used during a phase of the frequent itemset operation.

Hardware Overview

Figure 6:
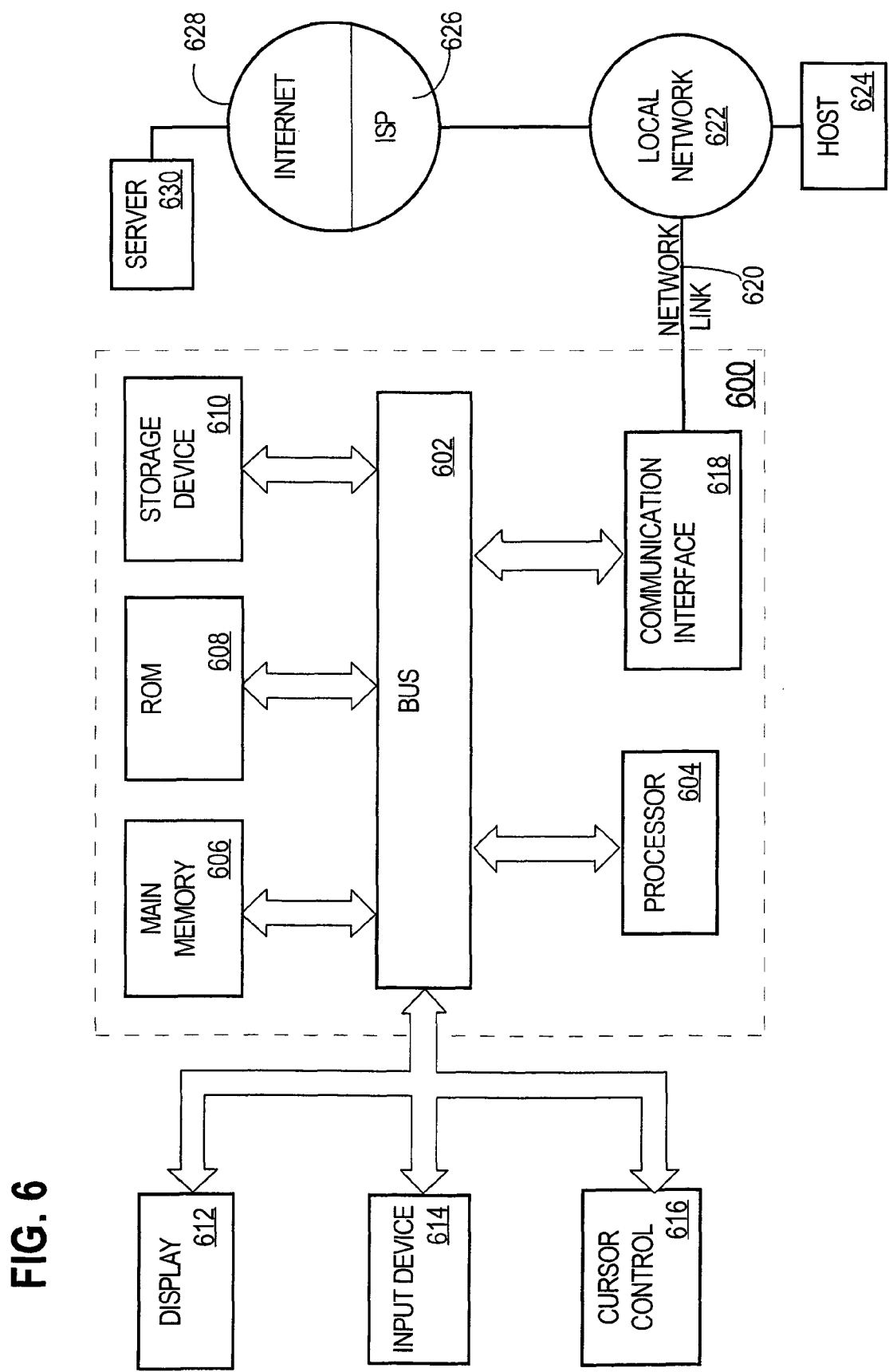
FIG. 6 is a block diagram of a computer system upon which embodiments of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for performing a frequent itemset operation, the method comprising the steps of:

receiving a database statement that specifies (1) a function name of a table function that identifies which itemsets occur together most frequently in a particular item group population and (2) a plurality of input parameters that are input parameters to the table function;

wherein the plurality of input parameters includes
a parameter for a support threshold that indicates a ratio,
a parameter for a cursor that indicates the particular item group population, and
a parameter for a minimum length that indicates a minimum length for frequent itemsets that are identified by the table function;

wherein the ratio indicates what percentage of transactions, of a particular set of transactions, must contain a given itemset for the given itemset to qualify as a frequent itemset;

in response to receiving the database statement, calling the table function and passing, as input to the table function, values for each of the plurality of input parameters;

wherein results returned by the table function, in response to calling the table function, identify which itemsets occur together most frequently in the particular item group population, excluding all itemsets that (a) include fewer items than the minimum length and (b) do not satisfy the support threshold;

wherein the method is performed by one or more computing devices.

2. The method of claim 1, wherein:
the table function is configured to accept input data that is in a particular format;
the particular format of the input data is one of a single-item-per-row format or a multiple-items-per-row format.

3. The method of claim 1, further comprising, in response to calling the table function, transforming rows from a single-item-per-row format into a multiple-items-per-row format.

4. The method of claim 1, wherein the results of calling the table function indicate a total transaction count.

5. The method of claim 1, wherein the results of calling the table function indicate a number of transactions in which a particular frequent itemset occurs.

6. The method of claim 1, wherein the plurality of input parameters includes a maximum length, wherein the results of calling the table function exclude all itemsets that include more items than the maximum length.

7. The method of claim 1, wherein the plurality of input parameters includes a set of one or more included items, wherein the results of calling the table function exclude all itemsets that do not include at least one item in the set of one or more included items.

8. The method of claim 1, wherein the plurality of input parameters includes a set of one or more excluded items, wherein the results of calling the table function exclude all itemsets that include any item in the set of one or more excluded items.

9. The method of claim 1, further comprising, in response to calling the table function:
during a first phase of a multiple phase elimination process:
identifying a first set of itemset candidates and determining whether each itemset in the first set of itemset candidates satisfies one or more frequent itemset criteria associated with the table function;
identifying a second set of itemset candidates, each of which satisfies the one or more frequent itemset criteria associated with the table function, wherein the second set of itemset candidates is a strict subset of the first set of itemset candidates;

during a second phase of the multiple phase elimination process:
identifying the second set of itemset candidates and determining whether each itemset in the second set of itemset candidates satisfies one or more second frequent itemset criteria associated with the table function.

10. The method of claim 1, further comprising, in response to calling the table function, determining whether a particular itemset candidate satisfies the support threshold, wherein determining whether the particular itemset candidate satisfies the support threshold comprises:
creating a single-item bitmap for each possible item of a plurality of possible items;
performing a Boolean AND operation between the single-item bitmaps to create a combination bitmap that represents a candidate combination;
determining, based on the combination bitmap, how many item groups include the candidate combination;
determining, based on a number of item groups that include the candidate combination, whether the candidate combination satisfies the support threshold.

11. The method of claim 1, further comprising:
creating a plurality of cluster bitmaps, wherein each cluster bitmap is associated with a base bitmap and a set of combinations, wherein the set of combinations have the base bitmap in common.

12. The method of claim 1, further comprising, in response to calling the table function:
generating a prefix tree based on a set of candidate combinations for a particular phase of multiple phase counting technique;
wherein the prefix tree is a number of levels deep, wherein the number of levels deep is equal to a number of items in each candidate combination of the set of candidate combinations, wherein each node in the prefix tree is associated with an item;
wherein each leaf node in the prefix tree represents a candidate combination of the set of candidate combinations;
for each item group of multiple item groups in the particular item group populations, traversing the prefix tree to determine a number of occurrences, in the multiple item groups, of each candidate combination in the set of candidate combinations.

13. The method of claim 1, further comprising, after calling the table function:
based on one or more criteria, selecting a candidate itemset counting technique from among a plurality of candidate itemset counting techniques.

14. The method of claim 1, further comprising, after calling the table function and before the results are returned:
during a first phase of the frequent itemset operation, selecting a first candidate itemset counting technique from among a plurality of candidate itemset counting techniques;
during a second phase of the frequent itemset operation, selecting a second candidate itemset counting technique from among the plurality of candidate itemset counting techniques, wherein the second candidate itemset counting technique is different than the first candidate itemset counting technique.

15. One or more non-transitory storage media storing instructions for performing a frequent itemset operation, wherein the instructions, when executed by one or more processors cause:
receiving a database statement that specifies (1) a function name of a table function that identifies which itemsets occur together most frequently in a particular item group population and (2) a plurality of input parameters that are input parameters to the table function;

wherein the plurality of input parameters includes
a parameter for a support threshold that indicates a ratio,
a parameter for a cursor that indicates the particular item group population, and
a parameter for a minimum length that indicates a minimum length for frequent itemsets that are identified by the table function;

wherein the ratio indicates what percentage of transactions, of a particular set of transactions, must contain a given itemset for the given itemset to qualify as a frequent itemset;

in response to receiving the database statement, calling the table function and passing, as input to the table function, values for each of the plurality of input parameters;

wherein results returned by the table function, in response to calling the table function, identify which itemsets occur together most frequently in the particular item group population, excluding all itemsets that (a) include fewer items than the minimum length and (b) do not satisfy the support threshold.

16. The one or more storage media of claim 15, wherein:
the table function is configured to accept input data that is in a particular format;
the particular format of the input data is one of a single-item-per-row format or a multiple-items-per-row format.

17. The one or more storage media of claim 15, wherein the instructions, when executed by the one or more processors, further cause, in response to calling the table function, transforming rows from a single-item-per-row format into a multiple-items-per-row format.

18. The one or more storage media of claim 15, wherein the results of calling the table function indicate a total transaction count.

19. The one or more storage media of claim 15, wherein the results of calling the table function indicate a number of transactions in which a particular frequent itemset occurs.

20. The one or more storage media of claim 15, wherein the plurality of input parameters includes a maximum length, wherein the results of calling the table function exclude all itemsets that include more items than the maximum length.

21. The one or more storage media of claim 15, wherein the plurality of input parameters includes a set of one or more included items, wherein the results of calling the table function exclude all itemsets that do not include at least one item in the set of one or more included items.

22. The one or more storage media of claim 15, wherein the plurality of input parameters includes a set of one or more excluded items, wherein the results of calling the table function exclude all itemsets that include any item in the set of one or more excluded items.

23. The one or more storage media of claim 15, wherein the instructions, when executed by the one or more processors, further cause, in response to calling the table function:
during a first phase of a multiple phase elimination process:
identifying a first set of itemset candidates and determining whether each itemset in the first set of itemset candidates satisfies one or more frequent itemset criteria associated with the table function;
identifying a second set of itemset candidates, each of which satisfies the one or more frequent itemset criteria associated with the table function, wherein the second set of itemset candidates is a strict subset of the first set of itemset candidates;
during a second phase of the multiple phase elimination process:
identifying the second set of itemset candidates and determining whether each itemset in the second set of itemset candidates satisfies one or more second frequent itemset criteria associated with the table function.

24. The one or more storage media of claim 15, wherein the instructions, when executed by the one or more processors, further cause, in response to calling the table function, determining whether a particular itemset candidate satisfies the support threshold, wherein determining whether the particular itemset candidate satisfies the support threshold comprises:
creating a single-item bitmap for each possible item of a plurality of possible items;
performing a Boolean AND operation between the single-item bitmaps to create a combination bitmap that represents a candidate combination;
determining, based on a combination bitmap, how many item groups include the candidate combination;
determining, based on a number of item groups that include the candidate combination, whether the candidate combination satisfies the support threshold.

25. The one or more storage media of claim 15, wherein the instructions, when executed by the one or more processors, further cause:
creating a plurality of cluster bitmaps, wherein each cluster bitmap is associated with a base bitmap and a set of combinations, wherein the set of combinations have the base bitmap in common.

26. The one or more storage media of claim 15, wherein the instructions, when executed by the one or more processors, further cause, in response to calling the table function:
generating a prefix tree based on a set of candidate combinations for a particular phase of multiple phase counting technique;
wherein the prefix tree is a number of levels deep, wherein the number of levels deep is equal to a number of items in each candidate combination of the set of candidate combinations, wherein each node in the prefix tree is associated with an item;
wherein each leaf node in the prefix tree represents a candidate combination of the set of candidate combinations;
for each item group of multiple item groups in the particular item group populations, traversing the prefix tree to determine a number of occurrences, in the multiple item groups, of each candidate combination in the set of candidate combinations.

27. The one or more storage media of claim 15, wherein the instructions, when executed by the one or more processors, further cause, after calling the table function:
based on one or more criteria, selecting a candidate itemset counting technique from among a plurality of candidate itemset counting techniques.

28. The one or more storage media of claim 15, wherein the instructions, when executed by the one or more processors, further cause, after calling the table function and before the results are returned:
during a first phase of the frequent itemset operation, selecting a first candidate itemset counting technique from among a plurality of candidate itemset counting techniques;
during a second phase of the frequent itemset operation, selecting a second candidate itemset counting technique from among the plurality of candidate itemset counting techniques, wherein the second candidate itemset counting technique is different than the first candidate itemset counting technique.

\* \* \* \* \*

UNITED STATES PATENT AND TRADEMARK OFFICE
CERTIFICATE OF CORRECTION

PATENT NO. : 8,655,911 B2  
APPLICATION NO. : 10/643628  
DATED : February 18, 2014  
INVENTOR(S) : Wei Li et al.

Page 1 of 1

It is certified that error appears in the above-identified patent and that said Letters Patent is hereby corrected as shown below:

In the Specification:

In column 7, line 18, delete "a an" and insert -- an --, therefor.

In column 11, line 31, delete "Reteining" and insert -- Retaining --, therefor.

In the Claims:

In column 24, line 21, in Claim 24, delete "a" and insert -- the --, therefor.

Signed and Sealed this  
Twenty-fourth Day of June, 2014

Michelle K. Lee  
*Deputy Director of the United States Patent and Trademark Office*